July 22, 1958

G. CLIGNET 2,843,973

APPARATUS USED IN COMPRESSION MOULDING OF
OBJECTS OF GLASS AND LIKE MATERIAL

Filed Feb. 1, 1955

United States Patent Office 2,843,973
Patented July 22, 1958

2,843,973
APPARATUS USED IN COMPRESSION MOULDING OF OBJECTS OF GLASS AND LIKE MATERIAL

Georges Clignet, Reims, France, assignor to Ste: Verreries Charbonneaux, Reims, France, a French body corporate Application February 1, 1955, Serial No. 485,491

Claims priority, application France February 8, 1954

19 Claims. (Cl. 49—36)

The invention relates to compression moulding of objects of glass and like material capable of being moulded in a hot, molten or pasty state, and in particular objects comprising hollow or circular protruding portions. The process comprises placing in a mould a charge of glass or other material in the fluid state and then inserting into this charge a plunger or punch possessing projections and hollows corresponding to the hollow and projecting portions of the moulded object, this plunger or punch, in association with the mould, imparting to the moulded object the desired external and internal shapes. After moulding, the glass cools and shrinks and tends to bind on the punch or the plunger or on the projecting portions of the latter and the circular projecting portions of the object tend to bind on the walls of the hollow portions of the plunger or punch. If no precautions are taken, the resultant tensions cause fracture of the object obtained. It is therefore necessary to effect before the shinkage occurs, a withdrawal of the plunger or punch through such distance as to avoid said binding or sticking and yet still contribute to the support of the glass while the latter has not acquired, in the course of its cooling, sufficient rigidity.

The invention has for its object to provide a moulding apparatus for moulding objects of glass or like material by means of the aforementioned process, this apparatus being improved in such manner as to effect the abovementioned operations.

Another object of the invention is to provide a moulding apparatus for moulding objects of glass or like material which results in a considerable increase in the production rate owing to the use of a plurality of plungers in succession, these plungers being mounted on a rotatable turret and permitting objects of different shapes to be obtained, if desired, with the same apparatus.

The invention will be better understood from the ensuing description with reference to the accompanying drawings which show by way of example an embodiment of the invention shown applied to compression moulding of glass insulators.

Figure 1:
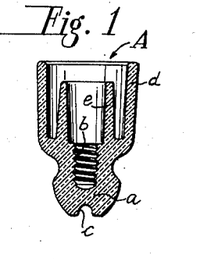
Fig. 1 is a vertical sectional view of a glass object to be moulded, such as an insulator.

With reference to Fig. 1, A designates the object to be moulded, for example a glass insulator comprising a hollow head $a$ having an interior screw thread $b$ and a recess $c$, and an exterior skirt portion $d$ and an interior skirt portion $e$.

Figure 2:
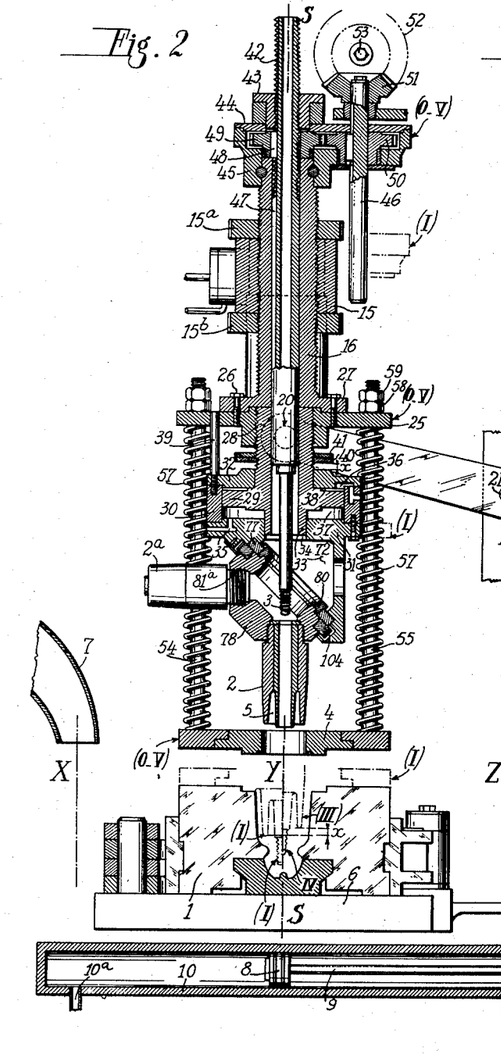
Fig. 2 is a vertical sectional view of the moulding machine taken on the line 2—2 of Fig. 3.

This object is moulded in a moulding cavity formed by the combination of a mould 1, comprising two parts separated along a vertical plane of symmetry, which is the plane of Fig. 2 of the drawing, the two parts being brought together for the moulding operation and separated for withdrawal of the moulded object; and a top or movable wall adapted to be applied against this mould so as to close the moulding cavity. The mass of glass or like material to be moulded is compressed in the cavity by this movable wall, the latter comprising the combination of one of two interchangeable plungers 2, 2ª, a punch 3 and a closing collar 4. The plunger 2 or 2ª in the course of operation occupies the vertical position shown by the plunger 2 in which it is coaxial with the punch 3 and the washer 4, their common axis being the vertical axis SS.

In the moulding position the lower surfaces of these three elements are contiguous. This moulding position, indicated at I in the drawing, is outlined by dot-dash lines in Fig. 2.

The problem of withdrawing the moulded object consists in detaching or loosening the plunger and the punch at the right moment so as to prevent the punch 3 from being bound or gripped by the hollow head $a$ and the shrinkage of the skirt portions $d$ and $e$ while they are still engaged in the corresponding recess 5 around the plunger, and in consequence the fracture of the insulator.

To this end, the apparatus is so arranged that, after having brought the movable wall comprising the vertical plunger 2, the punch 3, and the closing collar 4 into the moulding position I, said plunger and the punch are capable of withdrawing a small distance so as to effect the loosening and even the total withdrawal of those elements of the mould which oppose the shrinkage of the object. Thereafter, the whole unit comprising the movable wall is fully raised so as to permit the withdrawal of the moulded object.

In the embodiment of the invention shown in the drawings, the mould 1 is carried by a table 6 which is capable of being shifted to three positions:

(1) Position X, for receiving the glass charge or parison, in which the axis of the mould 1 is located under a trough 7 fed by the feeder of a glassmaking oven.

(2) Position Y, corresponding to the compression of the charge, in which the axis of the mould 1 coincides with the axis SS of the plunger 2.

(3) Position Z, corresponding to the withdrawal of the moulded object, in which a conventional mechanism causes the opening of the mould whereas a conventional extractor takes hold of the solidified insulator and places it on a suitable conveying means which conveys the object to the usual apparatus adapted to cool, anneal or harden the glass objects. These conventional mechanisms and devices do not form part of the invention and have not been shown.

The movements of the table 6 may be controlled in any suitable manner, for example by means of a pneumatic or hydraulic control, diagrammatically indicated by a piston 8 (Fig. 2) whose piston rod 9 is connected to the table 6. The piston slides in a fixed cylinder 10 provided with apertures 10ª and 10ᵇ corresponding respectively to the inlet and outlet of the motive fluid.

Figures 3, 4:
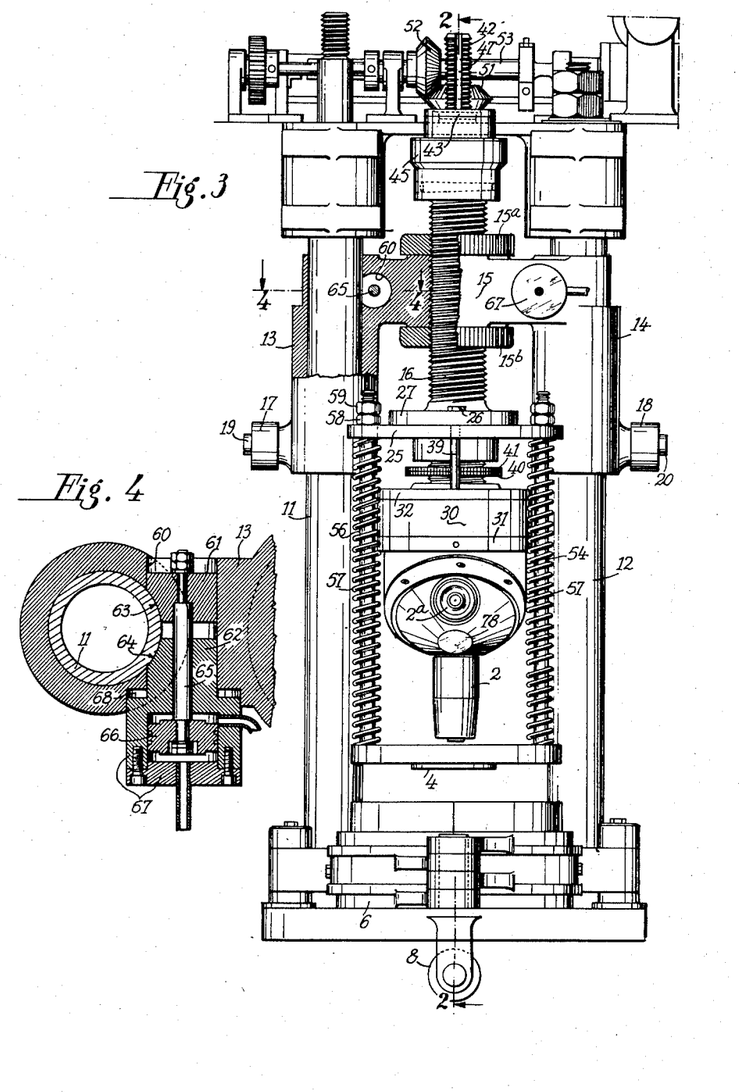
Fig. 3 is an elevational view of the machine.
Fig. 4 is a sectional view on an enlarged scale of the brake for the press head taken on the line 4—4 of Fig. 3.
Figure 5:
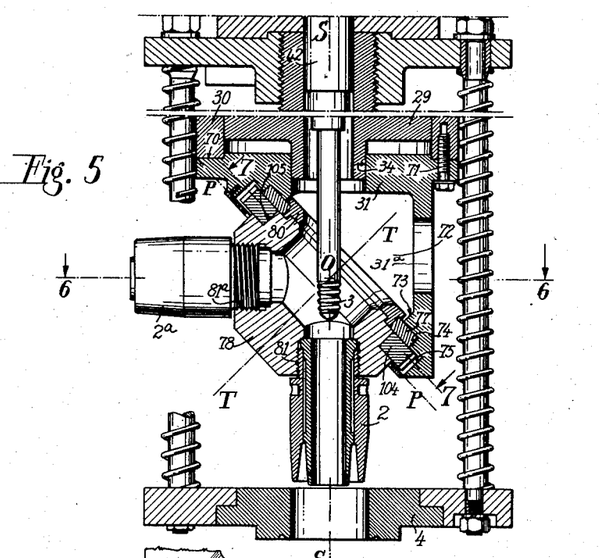
Fig. 5 is a view on an enlarged scale of the lower part of Fig. 2, this Fig. 5 corresponding to a sectional view taken on line 5—5 of Fig. 6.
Figure 6:
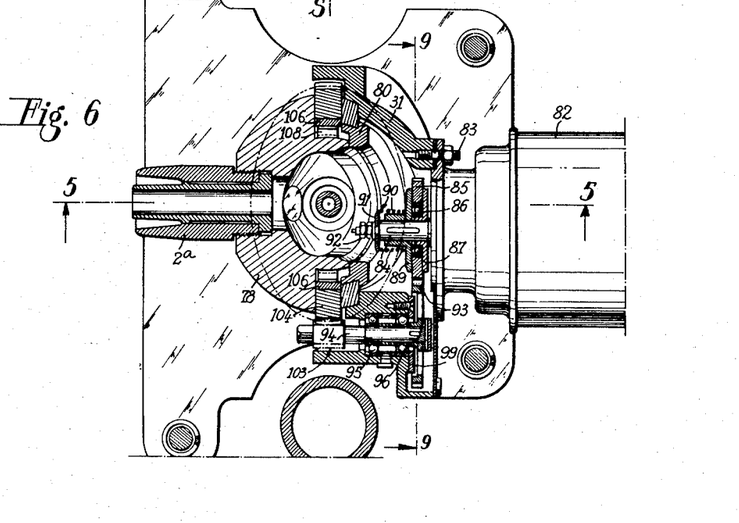
Fig. 6 is a horizontal sectional view taken on line 6—6 of Fig. 5.
Figure 7:
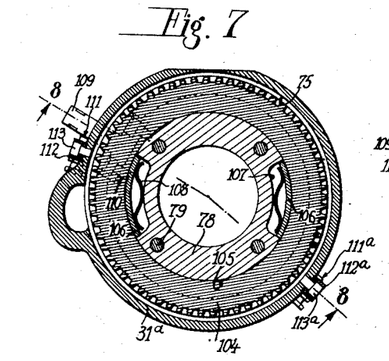
Fig. 7 is a cross-sectional view taken on the line 7—7 of Fig. 5.
Figure 8:
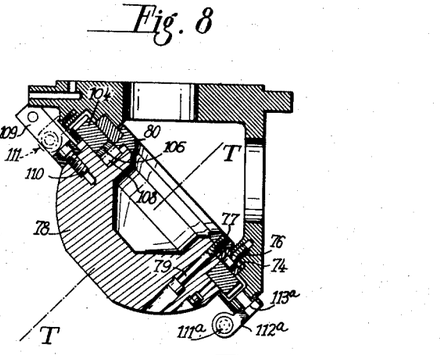
Fig. 8 is a vertical sectional view similar to that of Fig. 5 but taken on radial axial planes which are different from that of Fig. 5 and contain the line 8—8 of Fig. 7.
Figure 9:
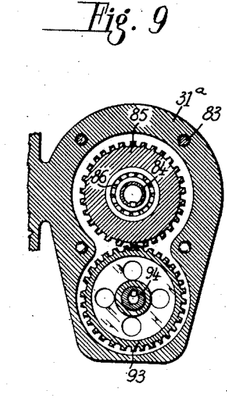
Fig. 9 is a vertical sectional view taken on line 9—9 of Fig. 6.
Figure 10:
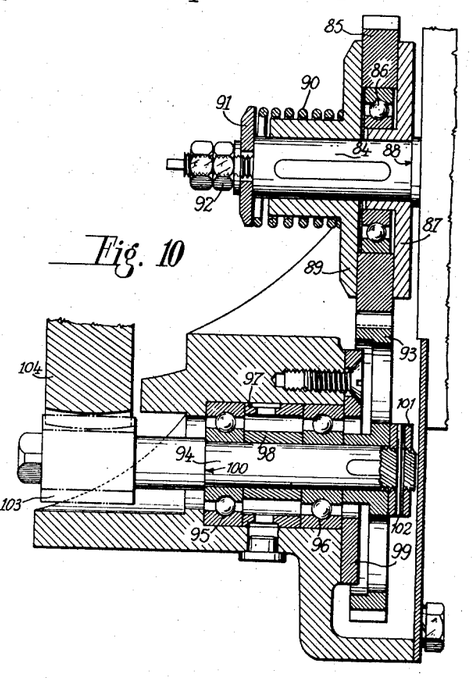
Fig. 10 is an enlarged view of a part of Fig. 6.

The plungers 2, 2ª, the punch 3 and the collar 4, are operatively connected, in a manner that will be fully described hereinafter, to a unit generally termed hereinafter press head. The latter is movable relative to a fixed stand comprising two vertical columns 11 and 12 (Fig. 3). Two tubes 13 and 14 are capable of vertically sliding on these columns and form part of a cast piece comprising a central stirrup 15. The latter is provided with a vertical tapped hole in which is screwed a vertical screw-threaded shaft 16 which supports the press head unit and is a part thereof. The screw-threaded connection permits an initial adjustment in height of the press head relative to the stirrup 15, this head being held in position by lock nuts 15ª and 15ᵇ.

The assemblage comprising the stirrup 15 with its tubes 13 and 14 and the press head unitary with the member 16, is capable of being displaced vertically along the columns 11 and 12 by any suitable mechanism which, in the illustrated example, is diagrammatically illustrated by two levers 17 and 18 connected to journals 19 and 20 unitary with the tubes 13 and 14. These levers are capable of pivoting about a spindle 21 and are controlled by a rod 22 of a piston 23 which moves in a cylinder 24 of a main jack or motor provided with an inlet and outlet associated with a fluid motor (air or liquid operated).

The operation of said main pneumatic or hydraulic motor is synchronized with that of the other members of the machine by suitable synchronizing devices which are not shown, since they are not part of the present invention. The vertical movements of the press head are co-ordinated or synchronized with the movements of the mould, the feeder, the opening device for the mould, the ejector and the other mechanisms mentioned hereinunder.

The press head comprises a series of members fixedly connected to the shaft 16, and which form the temporarily fixed part. These members comprise a plate 25 connected by screws 26 to an enlarged portion 27 of the shaft 16. Screwed in the plate 25 is a sleeve 28 which is integral with a piston 29.

Connecting means are movably connected to said temporarily fixed part, relative to which they perform their movements, and are connected to the plungers 2, 2ª, the punch 3, and the closing collar 4.

The connecting means connected to the plungers 2 and 2ª comprises the body of an auxiliary motor or jack for the aforementioned loosening operation. This body comprises a cylinder 30, surrounding in a fluid-tight manner the piston 29, and two cylinder ends 31 and 32. The sleeve 28 slides in a fluid-tight manner in the upper end 32, and the end 33 of the sleeve 28 is capable of moving in a fluid-tight manner in a bore 34 in the cylinder end 31. A turret 78 carrying the plungers 2 and 2ª is rotatably mounted on the end 31, as will be described below. The cylinder 30 comprises inlet and outlet apertures 35, 36 for the motive or actuating fluid which is capable of exerting pressure alternately in the lower chamber 37 or the upper chamber 38 of the jack on either side of the piston 29. Thus the unit comprising the plungers 2, 2ª, their turret 78, the supporting end 31 and the cylinder 30, is capable of moving relative to the piston 29 and the shaft 16, under the action of the fluid admitted in said jack above or below its piston. These movements are guided by a rod 39 which is unitary with the cylinder and is slidable in an aperture formed in the plate 25 and they are limited in an adjustable manner by a nut 40 and a lock nut 41 screwed on the screw-threaded sleeve 28.

The connecting means connected to the punch 3 comprises a vertical screw 42 which extends through aligned bores formed in the sleeve 28 and in the shaft 16. This screw 42 is screwed in a nut 43 unitary with the cover 44 of a housing 45 which is rigidly secured to the shaft 16. This housing is prevented from rotating owing to the fact that the cover 44, which is prolonged laterally, has an aperture which is slidable along a fixed shaft 46 carried by the frame of the apparatus.

The screw 42 has a longitudinal recess 47 in which is slidable the key 48 of a gear 49 which meshes with a gear 50 slidably keyed to the shaft 46. The latter is driven, through a pair of bevel gears 51, 52, by a shaft 53 driven by a motor, not shown, controlled by the synchronizing mechanism mentioned above.

Rotation of the shaft 53 causes rotation of the screw 42. As the nut 43 is prevented from rotating, the screw moves axially relative to the shaft 16 and this causes displacement of the punch 3. The pitch of the screw 42 must correspond to that of the pitch of the screw thread on the punch 3 which is to be inserted in the glass.

The connecting means connected to the closing collar 4 comprises four rods such as 54, 55, 56 which are fixed to the collar and are slidable in apertures formed in the plate 25. Coil compression springs 57 urge the collar downwardly whereas nuts 58 and lock nuts 59 limit the downward travel.

When the press head is in the position I, corresponding to compression of the moulding charge, it is necessary temporarily to hold it in position by a brake so as to allow the initial loosening of the plunger. To this end, the stirrup 13, 14, 15 is provided with two horizontal cylindrical bores such as 60 (Fig. 4) which communicate with vertical guide bores for the columns 11 and 12, and in each of which are housed two cylindrical brake blocks 61, 62. The latter are provided with cylindrical recesses at 63, 64 so as to fit against the periphery of the columns 11 and 12. Secured to the block 61 is the rod 65 of a piston 66 which is movable in the cylinder 67 of a pneumatic or hydraulic brake jack. This cylinder is integral with the block 62 which the rod 65 extends through axially. The cylinder is provided with inlet and outlet apertures for the motive or actuating fluid on either side of the piston. An axial clearance 68 is provided between the end of the cylinder 67 and the end of its seating in the unit 13, 14, 15. When the motive fluid acts on one side of the piston, the blocks 61, 62 are pressed against the corresponding column 11, 12 and this holds the unit 13, 14, 15 stationary. When it acts on the other side of the piston, the blocks 61, 62 separate and release the unit 13, 14, 15.

Reference will now be had to Figs. 5 to 10, which show the arrangement of the turret 78 on the bottom of the cylinder 31, which forms a support, the driving mechanism for this turret, and the attachment of the plungers 2, 2ª on the latter.

The bottom end 31 of the cylinder 30 comprises an upper annular seating provided with a well-finished peripheral recess 70 for fitting and centering this end on the body 30 of the cylinder to which it is fixed by screws 71. Fixed to this bottom end or integral with it are depending portions constituting a turret support 31ª which has one face lying in a plane PP (Fig. 5) inclined at 45° to the vertical axis SS. This depending portion is hollowed out at 72 to allow the free axial movement of the screw 42 and of the punch 3. The cavity thereby formed in the depending portion communicates with the exterior through a circular opening 73 lying in the plane PP. This opening is enlarged at 74 and 75 in the form of two recesses.

Fixed in the recess 74 by screws 76 (Fig. 8) is a ring 77 which extends radially inward of the opening 73 and is adapted to maintain a turret 78 in this opening while permitting rotation thereof about the axis TT inclined at 45° relative to the axis SS. This turret is connected by screws 79 to a ring 80 which is fixed on this turret concentrically with the axis TT and is supported by the ring 77.

The turret 78 has the shape of a cup in which are disposed two tapped bores 81 and 81ª having axes inclined at 45° relative to the axis TT, these axes intersecting on the latter at O. Screwed in these bores are the plungers 2 and 2ª. Thus, when one of them (2) is coaxial with the axis SS in its operative or working position, the other is inoperative and in position 2ª. It will be understood therefore that it is sufficient to pivot this turret about the axis TT through 180° in one direction or the other, to position on the axis SS the plunger 2ª instead of the plunger 2, or vice versa.

The turret 78 may of course be rotated by hand. However, preferably a reversible electric motor 82 (Fig. 6) performs this function. This motor, whose windings are preferably insulated by silicon so as to resist the high ambient temperature, is fixed by studs 83 to the depending portion of the support 31ª. Its shaft 84 is connected by a first force-limiting friction device to a gear 85. The latter is freely rotative on the shaft 84 owing to the provision of an antifriction bearing 86 (Figs. 6 and 10) mounted on the hub of a flange member 87 and gripped between the latter, which bears against a shoulder 88 of the shaft, and a plate 89 slidably keyed to the shaft and urged against the gear 85 by a spring 90. The other end of the latter bears against a washer 91 held at the end of the shaft by a nut 92. The flange member 87 and the plate 89 are preferably of bronze.

The gear 85 meshes with a second gear 93 keyed to a shaft 94. The latter is journalled in the support 31ª by means of two anti-friction bearings 95 and 96 held spaced apart by two tubular spacer members 97 and 98, these bearings being retained in a housing in said depending portion by a plate 99.

The shaft 94, which is held in position in the longitudinal direction by a shoulder 100 and a nut 101 pinned at 102, extends beyond the bearing in the form of a helical gear 103. This gear meshes with a toothed ring 104 which is concentric with the axis TT and is housed with clearance in the recess 75 of the support 31ª. It is rotatably mounted on the bearing 105 of the turret 78. The latter is connected for rotational movement with this ring by a second force-limiting friction device comprising two blocks 106 which are housed in arcuate recesses 107 (Fig. 7) formed in the turret 78 and are urged against the inner cylindrical surface of the ring 104 by a suitably formed resilient blade 108.

As will be understood, the motor 82 drives, through the force-limiting device 87—89, the gear train 85—93 which drives, through the helical gear 103, the ring 104, and the latter in turn drives, through the second force-limiting device 106—108, the turret 78. The second force-limiting device is therefore connected in series with the first force-limiting device.

The rotation of the turret 78 in either direction is limited to 180° by a finger 109 (Figs. 7 and 8) which protrudes from the turret and is secured thereto by screws 110, this finger encountering either one of two adjustable abutments constituted by screws 111, 111ª screwed in members 112 or 112ª in turn connected by screws 113, 113ª to the support 31ª. Owing to the fact that the abutments are in the form of screws, it is easy to adjust them in such manner that when the finger 109 abuts against the screw 111 or 111ª the longitudinal axis of the plunger 2 or 2ª exactly concides with the vertical axis SS.

It will be noticed that, if it is desired to operate the machine automatically, there may be fixed near the abutments 101 and 101ª and on the members 112, 112ª, two electric control contacts (not shown) for the power supply of the motor 82, these contacts being actuated by the finger 109 and combined with the synchronizing device (not shown) for the apparatus, so that the turret 78 pivots so as to substitute one plunger for the other when the unit of the press head is in its upper position (position O or V of Fig. 2).

The apparatus operates in the following manner:

With the table 6 occupying the position for receiving the glass charge or parison, the mould 1 is in position X (Fig. 2) and the parison, in falling from the feeder through the trough 7, is received in the mould.

With the press head, together with the movable wall carried thereby, in the upper position (O, V) shown in full line, the table 6 enters into the operative moulding position so that the axis of the mould 1 coincides at Y with the axis SS. Motive fluid is admitted in the cylinder 24 below the piston 23 in the main motor. This piston rises and causes through the levers 18, the lowering of the press head unit down to the position I shown in dot-dash lines, the shaft 16 having been previously adjusted relative to the stirrup 15. In this downward travel the collar 4 is the first to enter into contact with the mould 1 and forms a rim which prevents an untimely overflow of the glass or like material upon entry of the punch. Then the plunger, which is positioned vertically at 2, and the punch 3 continue their downward travel, the rods 54, 55, 56 sliding in the plate 25 and the springs 57 being compressed.

During this same movement the chamber 37 under the piston 29 of the loosening jack is connected to the source of motive fluid and the chamber 38 is connected to the exhaust so that the plunger 2 is positioned at the end of its downward travel. The shaft 53 controlled by the synchronizing device is in such angular position that the punch 3 is also at the end of the downward travel relative to the piston 29. In this downward travel the key of the pinion 50 slides in the key-way in the shaft 46.

In this position I of the press head, the parison, whose volume is adjusted by the feeder in accordance with the volume of the insulator to be moulded, is distributed between the mould and the punch, whereafter the glass is moulded in its final shape (apart from shrinkage).

In this position, the synchronizing mechanism or device governs the arrival of the motive fluid in the brake cylinder 67 and the application of the brake, while the two chambers of the cylinder 24 of the main motor are connected to exhaust (phase II).

The synchronizing mechanism therefore governs the arrival of the motive fluid in the chamber 38 above the piston 29 of the loosening jack and the connection to the exhaust of the chamber 37. The whole unit unitary with the plungers 2, 2ª then rises relative to the rest of the press head a distance $x$, determined by the adjustment of the nuts 40, 41. Thus in the course of utilization, the plunger 2 withdraws or loosens from the product in the mould (position III shown in dot-dash line) and the shrinkage of the skirt portions $d$ and $e$ is now possible without risk of excessive stresses.

Further, the synchronizing mechanism rotates the shaft 53 which causes the rotation of the screw 42. The punch 3 is loosened from the glass and comes away from the screw thread formed in the glass a distance which is sufficient to allow the shrinkage of the glass without dangerous stresses (position IV shown in dot-dash lines). It will be noticed that the punch is slightly conical, which permits release of the glass after a slight upward travel of the punch.

These slight movements of withdrawal are, however, such as to support the glass if it is not yet completely solidified so as to prevent appreciable distortion of the object during its solidification.

When the cooling is such that the insulator supported in the mould no longer needs to be supported interiorly, the driving fluid is admitted to the cylinder 24 of the main jack above the piston 23, the lower face of the latter being connected to the exhaust, and the brake piston 66 is released. The piston 23 descends and the press head unit rises. The chamber 38 of the cylinder 30 of the loosening jack is connected to the exhaust and the chamber 37 fed with fluid under pressure so that the members occupy position V which is identical to the initial position O.

The table 6 then passes to the extracting position Z, the mould opens and the solidified insulator is withdrawn, after which the table 6 returns to the position X, which is the starting position for a new cycle of operations.

The operation is completed by the substitution of plunger 2ª or 2 for the plunger 2 or 2ª on the axis SS after each object is produced.

This substitution permits the production rate to be increased to the extent of 20% and this in consequence increases the output. Further, the behaviour of the plungers 2, 2ª is considerably improved for the plunger in its inoperative position is perfectly disengaged and may therefore cool off.

The plungers are, furthermore, very easily mounted and dismantled for cleaning.

The turret 78 may comprise more than two plungers the axes of which would be disposed in a cone having one of its generatrices coincident with the axis SS, the various axes being angularly equi-spaced in this cone. The turret in this case would always rotate in the same direction and intermittently, in accordance with the substitution of one plunger for the adjacent plunger.

The oscillations or the intermittent rotation of the turret 78 may be ensured by hand or by a hydraulic or pneumatic control device.

If desired, the turret may be axially rigid with the press head without provision of a limited longitudinal displacement, in the case of the moulding of objects not prone to bind on the plunger, the loosening mentioned above being therefore unnecessary.

Further, the machine, provided with the loosening arrangement for the plunger, may have only one plunger which is always situated on the axis SS. This would be the case notably when it concerns the moulding of objects having relatively large radial dimensions necessitating the use of a large plunger which would in consequence render the arrangement of a turret having several plungers difficult.

Figure 11:
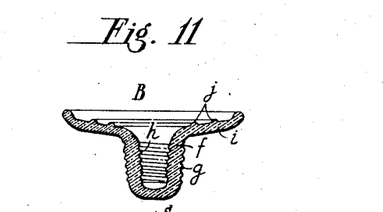
Fig. 11 is a vertical sectional view of a modification of the insulator to be moulded.

This would be the case in particular for the insulator shown in Fig. 11, which comprises a hollow head $f$ having an exterior screw-threaded portion $g$, an interior screw-threaded portion $h$ and a very divergent skirt portion $i$ provided with projecting ribs $j$.

Figure 12:
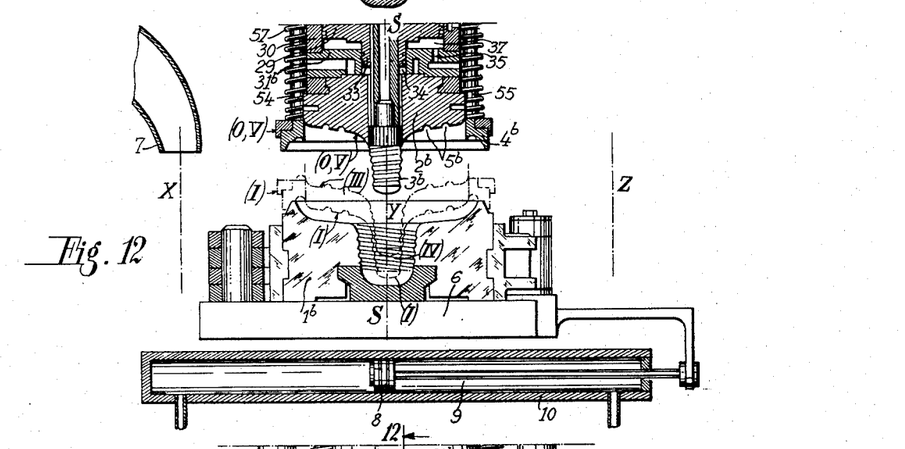
Figs. 12 and 13 are views corresponding respectively to the lower parts of Figs. 2 and 3, these parts being modified for the purpose of moulding the insulator shown in Fig 11.
Figure 13:
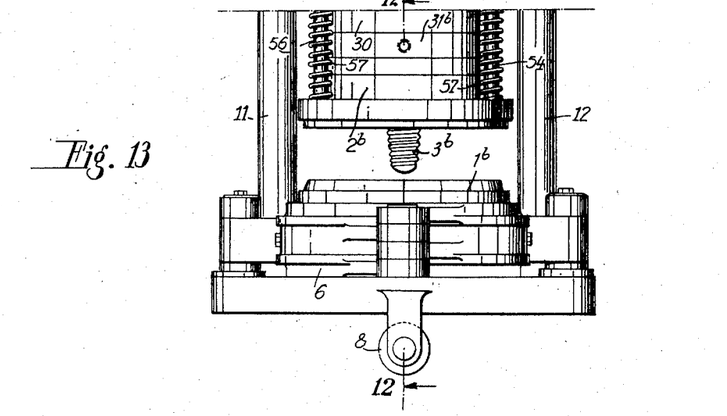

This object B may be moulded in the machine of which the lower part only has been shown in Figs. 12 and 13, the upper part of the machine being identical to that of the first example.

According to this modification, shown in Figs. 12 and 13, there is provided in combination with the lower part 1ᵇ of the mould, merely a single plunger 2ᵇ, permanently coaxial with the axis SS and comprising on its lower face grooves 5ᵇ adapted to form the ribs $j$ in the insulator. This plunger 2ᵇ is fixed directly to the end of the cylinder 31ᵇ which is flat and has no depending portion.

Further, the punch 3ᵇ and the support collar 4ᵇ correspond, in respect of shape and dimensions, to those of the object B.

This modification operates in a similar manner to that described above in respect of the first example.

Of course, if the object to be moulded has no interior screw-threaded portion such as $c$ so that the punch 3 is smooth, it would be unnecessary to rotate the latter. The arrangement could be very easily modified by rendering the nut 43 fixed to the gear 49 for rotational movement therewith and preventing the screw 42 from rotating relative to the spindle 16.

Although specific embodiments of the invention have been herein described, many changes and modifications may be made therein without departing from the spirit of the invention or the scope of the appended claims.

Having now described my invention what I claim as new and desire to secure by Letters Patent is:

1. In an apparatus for compression moulding objects of a material such as glass and plastic materials capable of being moulded hot, in combination: a stand; a lower part of a mould fixed in height; disposed above said lower part of the mould, an assemblage of members constituting a press head vertically movable relative to said stand; a main motor for imparting a vertical reciprocating movement to said head; disposed at the base of said head, a movable wall which constitutes the upper part of the mould and comprises at least two pieces, one at least of said two pieces comprising on its bottom face projections and recesses for forming complementary recesses and projections in the object to be moulded, at least some of said projections and recesses being prone to bind on the moulded object when the latter shrinks, said two pieces being separate and each of them being capable of individual movement relative to the press head, one piece comprising a peripheral obturating member adapted to be the first to enter into contact with said lower part of the mould so as to form a rim preventing escape of the material when it is compressed, and the other piece comprising a compression element for compressing said material in the lower part of the mould; an elastic device connecting said obturating member to the press head so as to permit the latter to continue its downward movement when said obturating member encounters said lower part of the mould; an auxiliary driving device independent of said main motor and connecting means connected to said auxiliary driving device and to said compression element for imparting to said element a small movement of withdrawal before said press head rises, when the moulded material has solidified sufficiently.

2. Apparatus as claimed in claim 1, for moulding an object which has an axial cavity provided with a female thread wherein said compression element comprises an axial punch, said auxiliary driving device is an auxiliary motor, and said connecting means comprises a rotative screw, said axial punch being provided with a male thread and being unitary with said screw for rotational movement therewith, and a nut fixed to said head is provided for said screw.

3. Apparatus as claimed in claim 2, further comprising a rotatable driving shaft journalled in said stand and a gear train connecting said shaft to said screw, the gears of said gear train being carried by the press head and said gear train comprising end gears slidably keyed respectively to said shaft and said screw.

4. In an apparatus for compression moulding objects of a material such as glass and plastic materials capable of being moulded hot, in combination: a stand; a lower part of a mould fixed in height; disposed above said lower part of the mould, an assemblage of members constituting a press head vertically movable relative to said stand; a main motor for imparting a vertical reciprocating movement to said head; disposed at the base of said head, a movable wall which constitutes the upper part of the mould and comprises at least two pieces, one at least of said pieces comprising on its bottom face projections and recesses for forming complementary recesses and projections in the object to be moulded, at least some of said projections and recesses being prone to bind on the moulded object when the latter shrinks, said two pieces being separate and each of them being capable of individual movement relative to the press head, one piece comprising a peripheral obturating member adapted to be the first to enter into contact with said lower part of the mould so as to form a rim preventing escape of the material when it is compressed, and the other piece comprising an element for compressing said material in the lower part of the mould; elastic devices connecting said obturating member to the press head so as to permit the latter to continue its downward movement when said obturating member encounters said lower part of the mould, an auxiliary driving device independent of said main motor and connecting means connected to said auxiliary device and to said compression element for imparting to said element a small movement of withdrawal before said press head rises when the moulded material has solidified sufficiently; and a brake device for holding said head stationary relative to said stand during the withdrawal of said separate pieces of said movable wall.

5. Apparatus as claimed in claim 4, wherein said peripheral member comprises a circular collar.

6. Apparatus as claimed in claim 4, wherein said compression element is a plunger, and said auxiliary driving device and said connecting means are combined to form a hydraulic jack comprising a cylinder and a piston, one of these two parts being connected to the plunger and the other being fixed to said press head.

7. Apparatus as claimed in claim 6, wherein said cylinder is connected to said plunger and said piston is fixed to said press head.

8. Apparatus as claimed in claim 6, wherein said stand comprises upright members, said press head comprises a stirrup slidably mounted on said upright members and said piston is adjustable relative to said stirrup.

9. Apparatus as claimed in claim 8, wherein said stirrup is provided with tubes slidable along said upright members, brake blocks being disposed in said tubes and being movable so as to bear against said upright members, these brake blocks being combined with a driving device adapted to shift them to their operative braking position and to their inoperative non-braking position.

10. In an apparatus for compression moulding objects of a material such as glass and plastic materials capable of being moulded hot, in combination: a stand; a lower part of a mould fixed in height; disposed above said lower part of the mould, an assemblage of members constituting a press head vertically movable relative to said stand; a main motor for imparting a vertical reciprocating movement to said head; disposed at the base of said head a movable wall which constitutes the upper part of the mould and comprises three pieces, one at least of said pieces comprising on its bottom face projections and recesses for forming complementary recesses and projections in the object to be moulded, at least some of said projections and recesses being prone to bind on the moulded object when the latter shrinks, said three pieces being separate and each of them being capable of individual movement relative to the rest of the press head, the first piece comprising a peripheral obturating member adapted to be the first to enter into contact with said lower part of the mould so as to form a rim preventing the escape of the material when it is compressed, the second piece comprising an axial punch and the third piece comprising a plunger coaxial with the punch, the latter and the plunger being adapted to compress said material in the lower part of the mould; elastic devices connecting said obturating member to the press head so as to permit the latter to continue its downward movement when said obturating member encounters said lower part of the mould; two auxiliary driving devices independent of one another and of said main motor for imparting respectively to said punch and to said plunger a small withdrawing movement before said press head rises when the moulded material has solidified sufficiently; and connecting means connecting said two auxiliary driving devices respectively to said punch and plunger.

11. In an apparatus for the compression moulding of objects of a material such as glass and plastic materials capable of being moulded hot, in combination: a stand; a lower part of a mould fixed in the vertical direction; disposed above said lower part of the mould, an assemblage of members constituting a press head axially and vertically movable relative to said stand; a main motor for imparting a vertical reciprocating movement to said head; a movable element adapted to undergo a small vertical movement relative to said press head; controlling means for controlling said small vertical movement of said movable element; a turret support fixed to said movable element; a turret rotatably mounted on said turret support; two plungers fixed to said turret with their axes disposed at 90° to one another and said turret being mounted for rotation about an axis which bisects said angle between the axes of the plungers and intersects said vertical axis of the press head at 45°, so that by rotating the latter, any one of the plungers can be brought in an operative position coaxial with the vertical axis of said head.

12. Apparatus as claimed in claim 11, wherein there is provided a reversible electric motor, carried by said head for rotating said turret, there being provided a finger which co-operates with two adjustable abutments corresponding to the end of the travel of the turret, one of these abutments being carried by said turret and the other abutment being carried by said turret support.

13. Apparatus as claimed in claim 11, further comprising an electric motor for rotating said turret and at least one force-limiting friction device interposed between said motor and said turret.

14. In an apparatus for compression moulding objects of a material such as glass and plastic materials capable of being moulded hot, in combination: a stand; a lower part of a mould fixed in the vertical direction; disposed above said lower part of the mould, an assemblage of members constituting a press head vertically movable relative to said stand; a main motor for imparting a vertical reciprocating movement to said head; a turret support capable of vertical movement through a limited distance in said head, a turret rotatably mounted in said turret support; a group of at least two plungers fixed to said turret so that, by rotating the turret, any one of these plungers can be brought into an operative position coaxial with the vertical axis of said head; disposed at the base of said head a peripheral obturating member for constituting, with the plunger which is in the operative position, at least a portion of the upper part of the mould, this obturating member comprising on its bottom face projections and recesses for forming complementary recesses and projections in the object to be moulded, at least some of said projections and recesses being prone to bind on the moulded object when the latter shrinks and said obturating member being adapted to be the first to enter into contact with said lower part of the mould so as to form a rim preventing the escape of the material when it is compressed in the lower part of the mould by said plunger in operative position; elastic devices connecting said obturating member to the press head so as to permit the latter to continue its downward movement when said obturating member encounters said lower part of the mould; and an auxiliary driving device independent of said main motor for imparting to the turret support and, in consequence, to the turret, a small withdrawing movement before said press head rises, when the moulded material has solidified sufficiently.

15. Apparatus as claimed in claim 14, wherein said auxiliary driving device comprises a jack whose piston is unitary with the press head, the cylinder of this jack being movable relative to said head and carrying the turret support on which said turret is rotatably mounted, the axis of rotation of this turret being inclined relative to the vertical axis of the head.

16. Apparatus as claimed in claim 15, comprising a motor which is carried by said end of the cylinder and is adapted to rotate said turret.

17. In an apparatus for compression moulding objects of a material such as glass and plastic materials capable of being moulded hot, in combination: a stand; a lower part of a mould fixed in the vertical direction; disposed above said lower part of the mould, an assemblage of members constituting a press head having a vertical axis and movable relative to said stand along said axis; a main motor for imparting a vertical reciprocating movement to said head; a hollow turret rotatably mounted in the latter; at least two plungers fixed to said turret so that, in rotating the latter, any of these plungers can be brought to an operative position coaxial with the axis of said head; disposed at the base of said head a movable unit which constitutes the upper part of the mould and comprises on its bottom face projections and recesses for forming complementary recesses and projections in the object to be moulded, at least some of said projections and recesses being prone to bind on the moulded object when the latter shrinks, said unit comprising three separate pieces each of which is capable of individual movement relative to the press head, one piece comprising a peripheral obturating member adapted to be the first to enter into contact with said lower part of the mould so as to form a rim preventing the escape of the material when it is compressed, the second piece comprising an axial punch and the third piece comprising that plunger of said plungers which is in operative position, this plunger being disposed between said peripheral obturating member and said punch and said plungers being provided with axial apertures so that when a plunger is in operative position said punch is allowed to pass therethrough freely; elastic devices connecting said obturating member to the press head so as to permit the latter to continue its downward movement when said obturating member encounters said lower part of the mould; and two auxiliary driving devices independent of one another and of said main motor for imparting respectively, on one hand to said punch, and, on the other hand, to said turret and to said plunger in operative position, a small movement of withdrawal before said press head rises, when the moulded material has solidified sufficiently.

18. In an apparatus for compression moulding objects of a material such as glass and plastic materials capable of being moulded hot, in combination: a stand; a movable horizontal table disposed on the latter; a lower part of a mould fixed to said table; a driving device for moving the latter and bringing said lower part of the mould into a position for receiving the material to be moulded, into a pressing position and into a position in which the moulded object may be withdrawn; disposed above said lower part of the mould when the latter is in its pressing position, an assemblage of members forming a press head which is vertically movable relative to the stand; a main motor for imparting a vertical reciprocating movement to said head; disposed at the base of the latter, a movable wall which forms the upper part of the mould and comprises on its bottom face projections and recesses for forming complementary recesses and projections in the object to be moulded, at least some of said projections and recesses being prone to bind on the moulded object when the latter shrinks, said wall comprising at least two separate pieces each of which is capable of individual movement relative to the rest of the press head, one piece comprising a peripheral obturating member adapted to be the first to enter into contact with said lower part of the mould so as to form a rim preventing the escape of the material when it is compressed, and the other piece comprising an element for compressing said material in the lower part of the mould; elastic devices connecting said obturating member to the press head so as to permit the latter to continue its downward movement when said obturating member encounters said lower part of the mould; and an auxiliary driving device independent of said main motor for imparting to said element a small withdrawing movement before said press head rises, when the moulded material has solidified sufficiently.

19. In an apparatus for the compression moulding of objects of a material such as glass and plastic materials capable of being moulded hot, in combination: a stand; a lower part of a mould fixed in the vertical direction; disposed above said lower part of the mould, an assemblage of members constituting a press head axially and vertically movable relative to said stand; a main motor for imparting a vertical reciprocating movement to said head; a piston fixed to said head, a cylinder slidably mounted on said piston for small vertical reciprocating movements, said piston defining in said cylinder an upper and a lower chamber, and means for feeding fluid under pressure into either of said chambers; a turret support fixed to said cylinder; a turret rotatably mounted on said turret support; two plungers fixed to said turret with their axes disposed at 90° to one another and said turret being mounted for rotation about an axis which bisects said angle between the axes of the plungers and intersects said vertical axis of the press head at 45°, so that by rotating the latter, any one of the plungers can be brought in an operative position coaxial with the vertical axis of said head.

References Cited in the file of this patent
UNITED STATES PATENTS
792,500    Cox et al. _____________ June 13, 1905